United States Patent Office 3,586,547

Patented June 22, 1971

3,586,547
METHOD OF PRODUCING A SILICON AVALANCHE DIODE

William B. Glendinning, Belford, and Albert Mark, Toms River, N.J., assignors to the United States of America as represented by the Secretary of the Army No Drawing. Filed Mar. 18, 1969, Ser. No. 808,352
Int. Cl. B01j *17/00;* H01l *7/50*
U.S. Cl. 148—175 1 Claim

ABSTRACT OF THE DISCLOSURE

A silicon substrate of (111) surface orientation is treated by growing a thermal oxide layer onto one surface of the substrate, etching windows through the thermal oxide layer, and vapor etching flat bottomed cavities through the windows using a hydrogen chloride-hydrogen vapor etch at 1150 degrees C. for six minutes and wherein the halide mole fraction of the vapor is about 0.02.

The invention described herein may be manufactured, used, and licensed by or for the Government for governmental purposes without the payment to us of any royalty thereon.

BACKGROUND OF THE INVENTION

This invention relates in general, to a method of treating silicon, and in particular, to a method of treating a silicon substrate of (111) surface orientation.

For most applications, the etching of numerous depressions into a silicon surface is done for the purpose of isolating specific areas on the surface which can then be backfilled epitaxially with silicon of high or low resistivity. Unless the cavity geometrics conform to the original mask pattern without being distorted, the regrowth of silicon into the cavities results in irregular-shaped topologies. This is detrimental to the regrowth interface for the creation of planar junctions.

SUMMARY OF THE INVENTION

The general object of this invention is to provide a method of making a cavity or cavities in a silicon substrate of (111) surface orientation in which the cavity will be characterized by a flat or planar bottom that is parallel to the surface of the silicon substrate.

A particular object of this invention is to provide a method of making a rectangular cavity or cavities in a silicon substrate of (111) surface orientation wherein at the required depth of the resulting cavity, the opposite walls will be straight-sided and parallel, and all four sides at right angles to the planar bottom.

It has now been found that flat bottomed cavities can be made in a silicon substrate of (111) surface orientation by a method comprising first growing a thermal oxide layer of about 10,000 angstroms in thickness onto one surface of the silicon substrate. Windows are then etched through the thermal oxide layer. These windows may be rectangular, circular, or of any other geometric configuration desired. Then, flat bottomed cavities are vapor etched through the windows using a hydrogen chloride-hydrogen vapor etch at 1150 degrees C. for six minutes wherein the halide mole fraction of the vapor is about 0.02.

The initial thermal oxide layer can be formed on one surface of the silicon substrate by well known methods as for example, oxidizing the silicon substrate or wafer at about 1100 degress C. by processing with wet oxygen for two and a half hours and with dry oxygen for 30 minutes. Forming an oxide layer of about 10,000 angstroms in thickness has been found most suitable in carrying out the method.

Windows are then etched through the oxide layer using conventional photolithographic and etch methods.

Flat bottomed cavities are then vapor etched through the windows using a hydrogen chloride-hydrogen vapor etch at 1150 degrees C. for six minutes, where the halide mole fraction of the vapor is about 0.02. The vapor etching can be conveniently carried out in a resistance heated T reactor. That is, the silicon wafer is placed on a graphite heater which is then clamped into the epitaxial resistance heated T reactor. Helium is flushed through the reactor for 5 minutes until all the air is displaced. Hydrogen is then generated through the reactor at the rate of 22 liters per minute for ten minutes, during which time the wafer is brought up to a temperature of 1150 degrees C. Hydrogen chloride gas is then introduced into the hydrogen stream at 1.3 percent of the total flow or 300 milliliters per minute. The wafer is then etched at a rate of about 0.4 to 0.7 micron per minute to an etch depth of about 4.0 microns. The etching takes place readily at elevated temperatures according to the recation.

$$3HCl + Si \xrightarrow{\Delta} SiHCl_3 + H_2$$

The run conditions are adjusted for the maximum etch rate at the lowest possible hydrogen chloride concentration and time cycles to prevent damage to the oxide mask.

Planar cavity bottoms result from carrying out the aforedescribed method, the flatness of which varies by not greater than 500 angstroms.

Refill of the resultant etched out cavities to the level of the original surface can then be accomplished by standard epitaxial methods for producing preliminary diode device structures.

For example, a silicon avalanche diode structure can be made by regrowing silicon epitaxially in a rectangular shaped etch-out of $N^+$ type conductivity using a system of silicon tetrachloride-hydrogen-hydrogen chloride. This is particularly accomplished by first growing an N type conductivity layer with an impurity concentration of phosphorous of $9.6 \times 10^{15}$ atoms per cc. and 3.0 microns thick. Then a $P^+$ type conductivity layer with an impurity concentration of boron of $1.0 \times 10^{19}$ atoms cc. and 1.0 micron thick is grown over the N type conductivity layer. The silicon dioxide preferential mask is then removed with buffered hydrogen fluoride solution followed by slow etching of the silicon surface to remove 0.25 micron of surface with a solution of 20 parts nitric acid-12 parts acetic acid-2 parts hydrogen fluoride. An oxide layer of about 500 angstroms in thickness is then regrown on the surafce using dry oxygen for 15 minutes at 920 degrees C. Windows are etched into the oxide surface and a gold contact layer evaporated onto the $P^+$ surface. Under reverse bias conditions, avalanche occurs in this design at 60 to 70 volts as the space charge region boundary touches the $N^+$ layer boundary. The depletion layer extends to the $N^+$ layer at all points of its boundary unlike other oscillator diode designs.

We wish it to be understood that we do not desire to be limited to the exact details of construction shown and described, for obvious modifications will occur to a pesron skilled in the art.

What is claimed is:

1. A method of making a silicon avalanche diode including the steps of:
   (A) growing a thermal oxide layer of about 10,000 angstroms in thickness onto one surface of a silicon substrate of (111) surface orientation and $N^+$ type conductivity,
   (B) etching a window through the thermal oxide layer,
   (C) vapor etching a flat bottomed cavity through the window using a hydrogen chloride-hydrogen vapor etch at 1150 degrees C. for six minutes wherein the halide mole fraction of the vapor is about 0.02, (D) epitaxially regrowing an N type conductivity layer and then a $P^+$ type conductivity layer into the rectangularly shaped etch-out, (E) removing the silicon dioxide preferential mask, (F) slow etching the silicon surface, (G) regrowing an oxide layer of about 500 angstroms in thickness, and (H) etching a window and evaporating a gold contact layer on the $P^+$ type conductivity surface.

References Cited

UNITED STATES PATENTS 3,425,879 2/1969 Shaw et al. ---------- 148—175

JACOB H. STEINBERG, Primary Examiner

U.S. Cl. X.R.

29—578; 156—17; 317—235